(12) United States Patent
Tanaka

(10) Patent No.: US 7,079,268 B1
(45) Date of Patent: Jul. 18, 2006

(54) PRINTING SYSTEM AND METHOD OF CONTROLLING SAME

(75) Inventor: Noriaki Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/503,478

(22) Filed: Feb. 14, 2000

(30) Foreign Application Priority Data

Feb. 15, 1999 (JP) ................... 11-036525

(51) Int. Cl.
*G06F 15/00* (2006.01)
*G06F 15/16* (2006.01)

(52) U.S. Cl. .................... 358/1.15; 358/434; 709/203; 709/216; 709/219

(58) Field of Classification Search ............... 358/1.15, 358/1.13, 1.16, 434; 713/201; 709/203, 709/213, 216, 219
See application file for complete search history.

(56) References Cited

U.S. PATENT DOCUMENTS

| | | | | |
|---|---|---|---|---|
| 5,537,626 A | * | 7/1996 | Kraslavsky et al. | 710/8 |
| 5,559,933 A | * | 9/1996 | Boswell | 358/1.15 |
| 5,991,846 A | * | 11/1999 | Ooki | 710/241 |
| 6,166,826 A | * | 12/2000 | Yokoyama | 358/1.16 |
| 6,292,267 B1 | * | 9/2001 | Mori et al. | 358/1.15 |
| 6,320,671 B1 | * | 11/2001 | Kelley et al. | 358/1.18 |
| 6,385,728 B1 | * | 5/2002 | DeBry | 713/201 |
| 6,424,429 B1 | * | 7/2002 | Takahashi et al. | 358/1.16 |
| 6,453,127 B1 | * | 9/2002 | Wood et al. | 399/8 |
| 6,469,796 B1 | * | 10/2002 | Leiman et al. | 358/1.15 |
| 6,476,927 B1 | * | 11/2002 | Schwarz, Jr. | 358/1.15 |
| 6,529,956 B1 | * | 3/2003 | Smith et al. | 709/229 |
| 6,552,816 B1 | * | 4/2003 | Shima | 358/1.15 |
| 6,636,891 B1 | * | 10/2003 | LeClair et al. | 709/208 |
| 6,639,690 B1 | * | 10/2003 | Yamazaki | 358/1.16 |
| 6,816,270 B1 | * | 11/2004 | Cooper et al. | 358/1.13 |

* cited by examiner

*Primary Examiner*—Douglas Q. Tran
*Assistant Examiner*—Chan S. Park
(74) *Attorney, Agent, or Firm*—Fitzpatrick, Cella, Harper & Scinto

(57) ABSTRACT

Disclosed are a printing system and a method of controlling the same, in which a terminal device storing image information to be printed is specified by an order management unit (203) in accordance with print requests from a plurality of terminal devices. Depending upon whether the specified terminal device and a printer to perform printing are connected locally or via a network (204), the specified terminal device is instructed to transfer the image information to a printer to perform printing. As a result, printing can be performed efficiently by a plurality of printers in response to print requests from a plurality of terminal devices connected via a network.

17 Claims, 10 Drawing Sheets

FIG. 5

| ID (501) | FILE NAME (502) | NUMBER OF PAGES TO BE PRINTED (503) | PRINTING DATE (504) |
|---|---|---|---|
| 1 | terminal_1b : image3.dat | 4 | |
| 2 | terminal_1n : image5.dat | 2 | |
| ⋮ | ⋮ | | |
| 10 | terminal_1a : image1.dat | 2 | 12 / 24 |
| | ⋮ | | |

FIG. 6

| | PRINT ORDER LIST | |
|---|---|---|
| ID | FILE NAME | NUMBER OF PAGES TO BE PRINTED |
| 1 | image3.dat | 4 |
| 2 | image5.dat | 2 |
| 3 | | |
| ⋮ | | |
| 10 | image1.dat | 2 |

SELECT IMAGE TO BE PRINTED

FIG. 7
| | ID | FILE NAME | PRINT ORDER LIST NUMBER OF PAGES TO BE PRINTED |
|---|---|---|---|
|  | 1 | image3.dat | 4 |
|  | 2 | image5.dat | 2 |
| ⋮ | ⋮ | ⋮ | ⋮ |
|  | 10 | image1.dat | 2 |

FIG. 9

DESIGNATION OF PRINT DESTINATION

1, DO NOT DESIGNATE

2, DESIGNATE

PRINT
DESTINATION

OK  CANCEL

PRINTING SYSTEM AND METHOD OF CONTROLLING SAME

FIELD OF THE INVENTION

This invention relates to a printing system, as well as to a method of controlling the same, in which printing is performed by a plurality of printers in response to print requests from a plurality of terminal devices connected via a network.

BACKGROUND OF THE INVENTION

The construction and operation of an image printing apparatus used in the prior art will be described.

FIG. 1 is a diagram illustrating the construction of an image printing apparatus according to the prior art. As shown in FIG. 1, the apparatus includes a central processing unit (CPU) 101 for controlling the overall apparatus; an internal storage 102 connected to the bus of the CPU 101 and typified by an random-access memory (RAM); an external storage device 103 of large storage capacity typified by a hard disk; a display unit 104 such as a CRT or liquid crystal display; a key input unit 105 such as a keyboard or pointing device; a peripherals controller 106 typified by a Centronics interface, SCSI or the like; and a printer 110 typified by a well-known electrophotographic or ink-jet printer.

When an operator uses the display unit 104 and key input unit 105 to order printing of image information that has been stored in the external storage device 103, the CPU 101 sequentially executes program code in the internal storage device 102.

More specifically, first the image data that has been stored in the external storage device 103 is read out and loaded in the internal storage device 102 using the peripherals controller 106. Next, the image information that has been loaded in the internal storage device 102 as a bit sequence is converted to a data structure suitable for printing and then transferred to the printer 110 using the peripherals controller 106.

As a result, the printer 110 prints the image information based upon the bit-sequence information received.

In the example of the prior art described above, multiple operators cannot print image information simultaneously and, hence, it is difficult to support an operation in which multiple image outputs are obtained.

Further, in a system in which a plurality of printers are connected via a network, jobs cannot be allocated effectively, making it difficult to achieve an efficient operation.

In a case where a plurality of printing systems such as that of the above-described prior art are operated, centralized control of print orders cannot be implemented and system operation and billing management, etc., are troublesome.

In other words, when statistics or billing information regarding all print jobs that belong to such a system is totalized, a totalization operation must be performed individually for each printing apparatus. This involves an enormous amount of work.

SUMMARY OF THE INVENTION

Accordingly, an object of the present invention is to provide a printing system, as well as a method of controlling the same, in which printing can be performed efficiently by a plurality of printers in response to print requests from a plurality of terminal devices connected via a network.

Another object of the present invention is to perform system operation and billing management efficiently by centralized control of print orders.

According to the present invention, the foregoing objects are attained by providing a printing system for performing printing by a plurality of printers in response to print requests from a plurality of terminal devices connected via a network, the system comprising: specifying means for specifying a terminal device, in which image information to be printed has been stored, in accordance with print requests from the plurality of terminal devices; and designating means for instructing a terminal device that has been specified by the specifying means to transfer the image information to a printer.

Further, according to the present invention, the foregoing objects are attained by providing a method of controlling a printing system for performing printing by a plurality of printers in response to print requests from a plurality of terminal devices connected via a network, the method comprising: a specifying step of specifying a terminal device, in which image information to be printed has been stored, in accordance with print requests from the plurality of terminal devices; and a designating step of instructing a terminal device that has been specified at the specifying step to transfer the image information to a printer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram showing order attribute information registered in an order management database;

FIG. 6 is a diagram showing a list of order attributes displayed on a display unit;

FIG. 7 is a diagram showing a list of order attributes which include thumbnail images (i.e., images of reduced size);

FIG. 9 is a diagram showing a print-destination designating screen according to this embodiment.

DESCRIPTION OF THE PREFERRED EMBODIMENT

A preferred embodiment of the present invention will now be described in detail with reference to the accompanying drawings.

Figure 2:
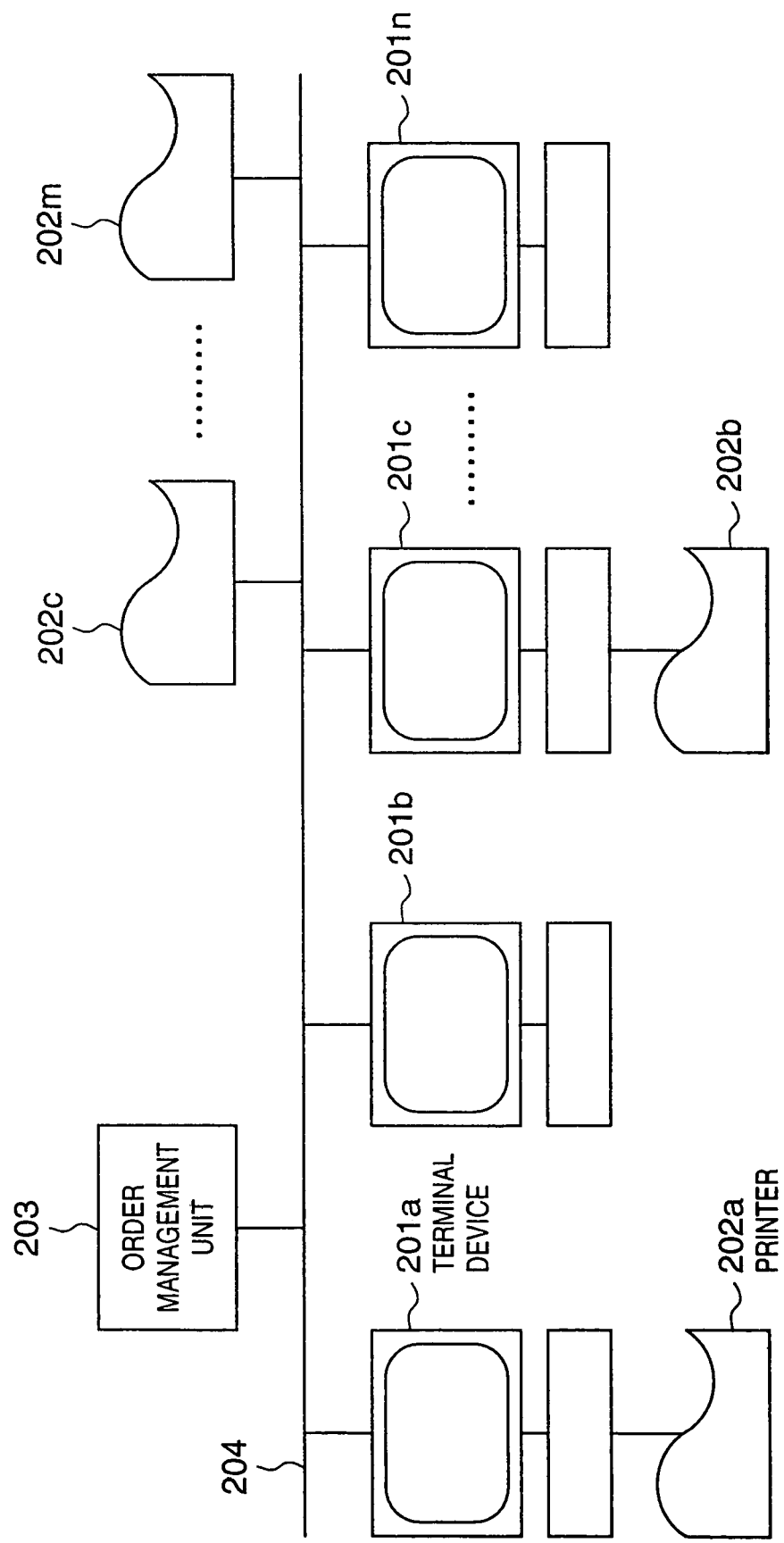
FIG. 2 is a diagram showing the configuration of an image printing system according to an embodiment of the present invention.

FIG. 2 is a diagram illustrating the configuration of an image printing system according to this embodiment. As shown in FIG. 2, the system includes terminal devices 201a, 201b, 201c, ..., 201n which operators use to order printing and generate print jobs; printers 202a, 202b, 202c, ..., 202*m* such as well-known electrophotographic or ink-jet printers for outputting the results of printing; an order management unit 203 for managing print jobs; and a network 204 connecting these components.

Some of the printers 202*a*, 202*b*, 202*c*, ..., 202*m* are connected locally to the terminal devices 201*a*, ..., 201*n* by peripherals controllers typified by the well-know Centronics interface or SCSI interface, and some of the printers are connected via the network.

For instance, in the example shown in FIG. 2, the printers 202*a*, 202*b* are connected locally to the terminal devices 202*a*, 201*c*, and the printers 202*c*, ..., 202*m* are connected via the network 204.

The construction of the terminal devices 201*a*, ..., 201*n* will be described next. Since the terminal devices are identical in construction, only the terminal device 201 will be described.

Figure 1:
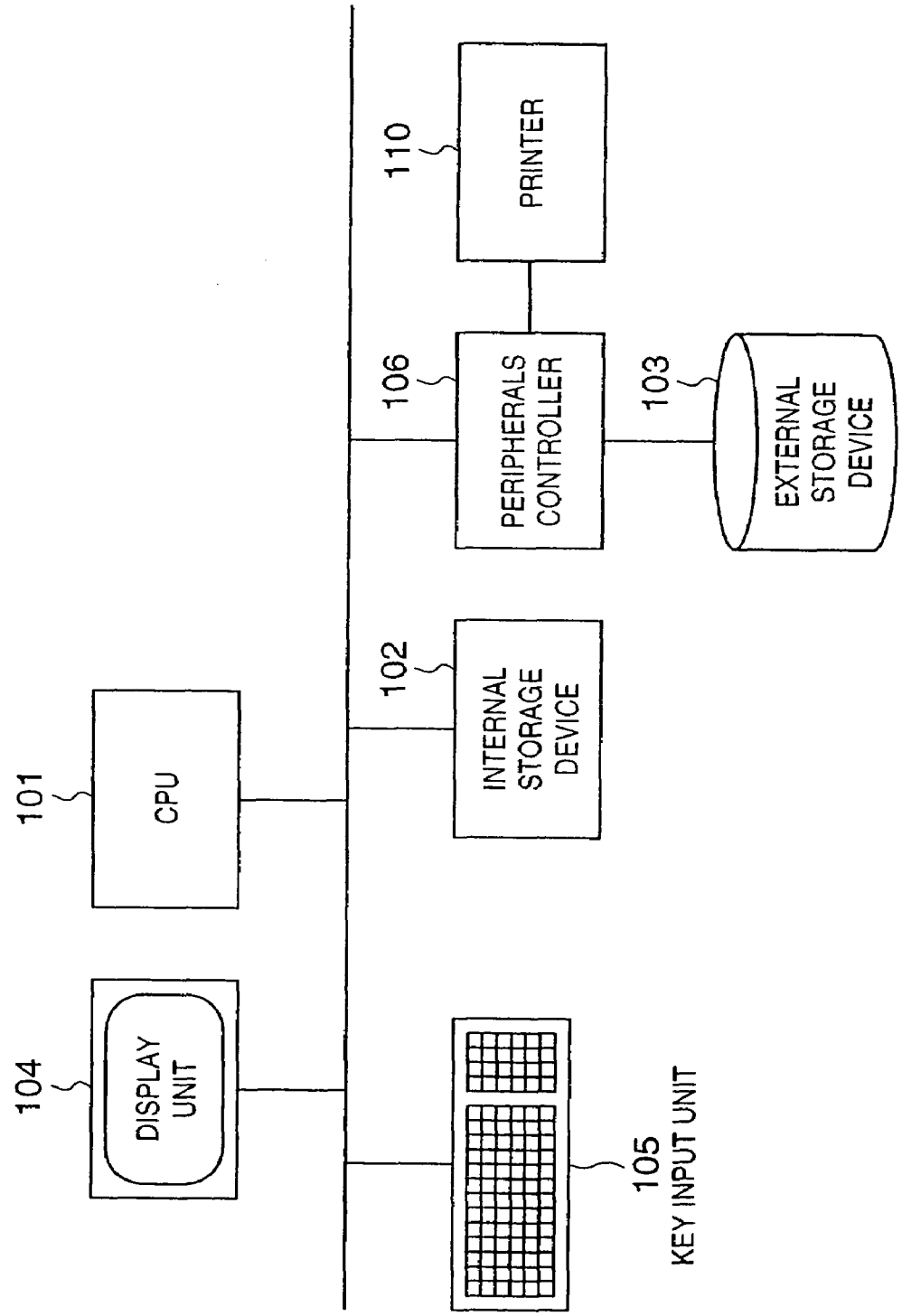
FIG. 1 is a diagram illustrating the construction of an image printing apparatus according to the prior art.
Figure 3:
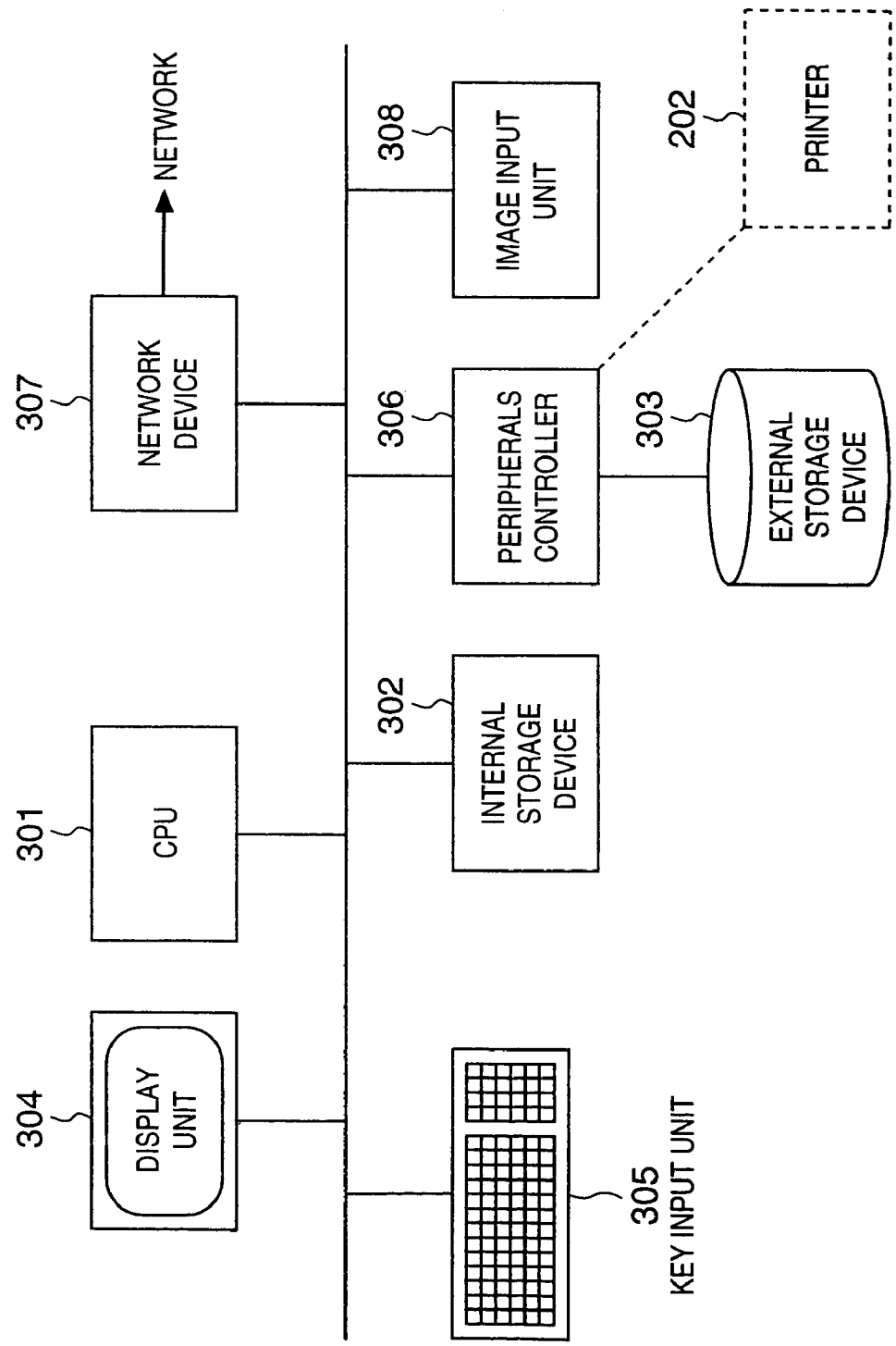
FIG. 3 is a diagram showing the construction of a terminal device according to this embodiment.

FIG. 3 is a diagram illustrating the construction of the terminal device 201 according to this embodiment. As shown in FIG. 3, the terminal device 201 includes a CPU 301, an internal storage device 302, an external storage device 303, a display unit 304, a key input unit 305 and a peripherals controller 306, which correspond to the components 101 to 106 shown in FIG. 1. A printer 202 is connected to the peripherals controller 306 as necessary. The terminal device 201 further includes a network device 307, which controls the connection to the network 204, and an image input unit 308. The image input unit 308 comprises a scanner for optically reading an image that has been recorded on, e.g., paper or film, and inputting image data representing the image read, or a reader device for reading in and outputting image data that has been recorded on a recording medium such as a floppy disk or magneto-optic disk.

The image data that has entered from the image input unit 308 is stored in the external storage device 303. Each image in the external storage device 303 has an image file assigned thereto and is managed by the image file.

The construction of the order management unit 203 shown in FIG. 2 will now be described.

Figure 4:
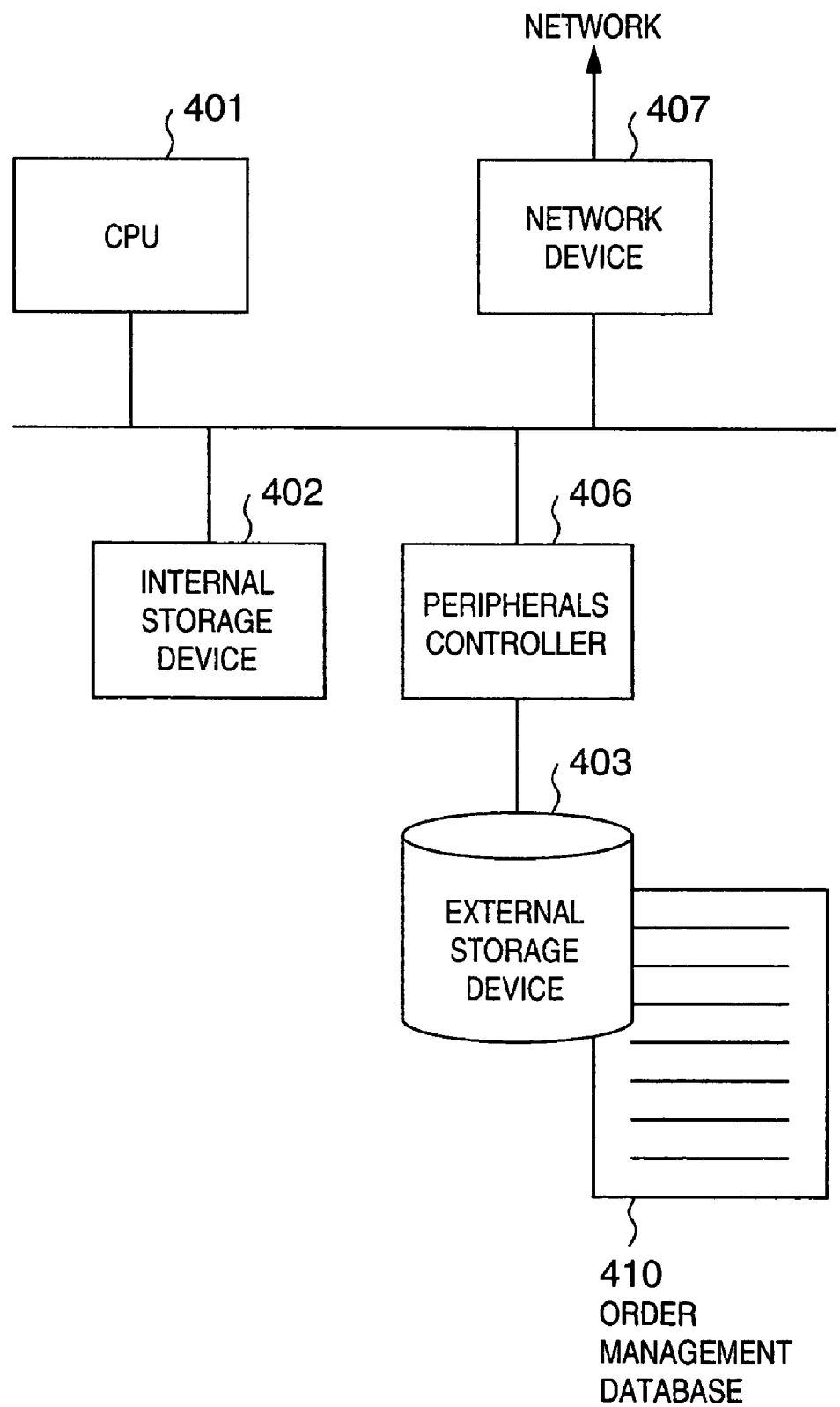
FIG. 4 is a diagram showing the construction of an order management unit according to this embodiment.

FIG. 4 is a diagram showing the construction of the order management unit 203 according to this embodiment. As shown in FIG. 4, the order management unit 203 includes a CPU 401, an internal storage device 402, an external storage device 403, a peripherals controller 406 and a network device 407. An order management database 410 is provided within the external storage device 403.

[Registration of Print Orders]

An operation through which an operator registers image data, which has been stored in the external storage device 303 of his/her own local terminal device, in the order management unit 203 using the terminal device 201*a* will now be described.

First, the operator manipulates the key input unit 305 of the terminal device 201*a* to designate one image in the image data of a plurality of files that have been input from the image input unit 308 and stored in the external storage device 303 within the terminal device 201*a* and to specify the creation of a print order. In response, the CPU 301 sends the order management unit 203 attribute information such as the name of the image file, the number of pages to be printed and the paper size, which have been stored in the external storage device 303, via the network device 307.

It is assumed that the name of an image file is constructed by the CPU 301 as a combination of a unique file name of each image in the external storage device 303 of the terminal device 201*a* and an identifier of the terminal device 201*a* and is sent to the order management unit 203.

By way of example, if the unique file name of a certain image in the terminal device 201*a* is image1.dat and the identifier of the terminal device 201*a* is terminal_1a, then the image file name that is sent to the order management unit 203 will be terminal_1a:image1.dat.

As shown in FIG. 2, the order management unit 203 is connected via the network and is adapted so as to communicate with all of the terminal devices 201*a*–201*n* and printers 202*a*–202*m*. A client-server scheme is employed as the mode of connecting each terminal device to the order management unit 203. As a result, the order management unit 203 is capable of accepting processing requests from a plurality of terminal devices simultaneously and asynchronously.

Image file names and attribute information received from the terminal device 201*a* are registered in the order management database 410 of the order management unit 203 in the manner shown in FIG. 5. In the example depicted in FIG. 5, order attribute information consists of an ID 501 for uniquely identifying an order, an image file name 502, number 503 of pages to be printed and print date 504.

In the example described above, the registration of an image file and attribute information in the order management unit 203 is executed in response to operation of the key input unit 305 by the operator. However, an arrangement may be adopted in which the image file and attribute information are registered in the order management unit 203 automatically using the input of image data from the image input unit 308 and the storage thereof in the external storage device 303 as the trigger.

[Order List]

An operation through which print orders that have been registered in the order management unit 203 are displayed as a list on the display unit 304 of terminal device 201*a* will now be described.

First, the operator manipulates the key input unit 305 of the terminal device 201*a* to request an order list that has been registered in the order management unit 203. In response, the CPU 301 of the terminal device 201*a* requests the order management unit 203 for the list of print orders, which have been registered in the order management database 410, via the network 204.

Upon receiving this request, the order management unit 203 reads out the entries of the order management database 410 sequentially and sends the order attribute information to the terminal device 201*a* via the network device 407. As a result, the terminal device 201*a* displays a list of the order attributes on the display unit 304 in the manner shown in FIG. 6.

As shown in FIG. 7, it is possible to display also thumbnail images (images of reduced size) of the print image information together with the list of order attributes. To display the thumbnail images, the CPU 401 of the order management unit 203 extracts the applicable files from the external storage device of the terminal device storing the image files based upon the file names in the order management database 410, reduces the images to the prescribed size and transfers the reduced images to the terminal device 201*a*, where the CPU 301 causes the images to be displayed on the display unit 304.

[Execution of Printing]

An operation through which an operator selects an order desired to be printed from the list displayed on the display unit 304 of the terminal device 201*a* and requests printing of the order will be described next.

Figure 8:
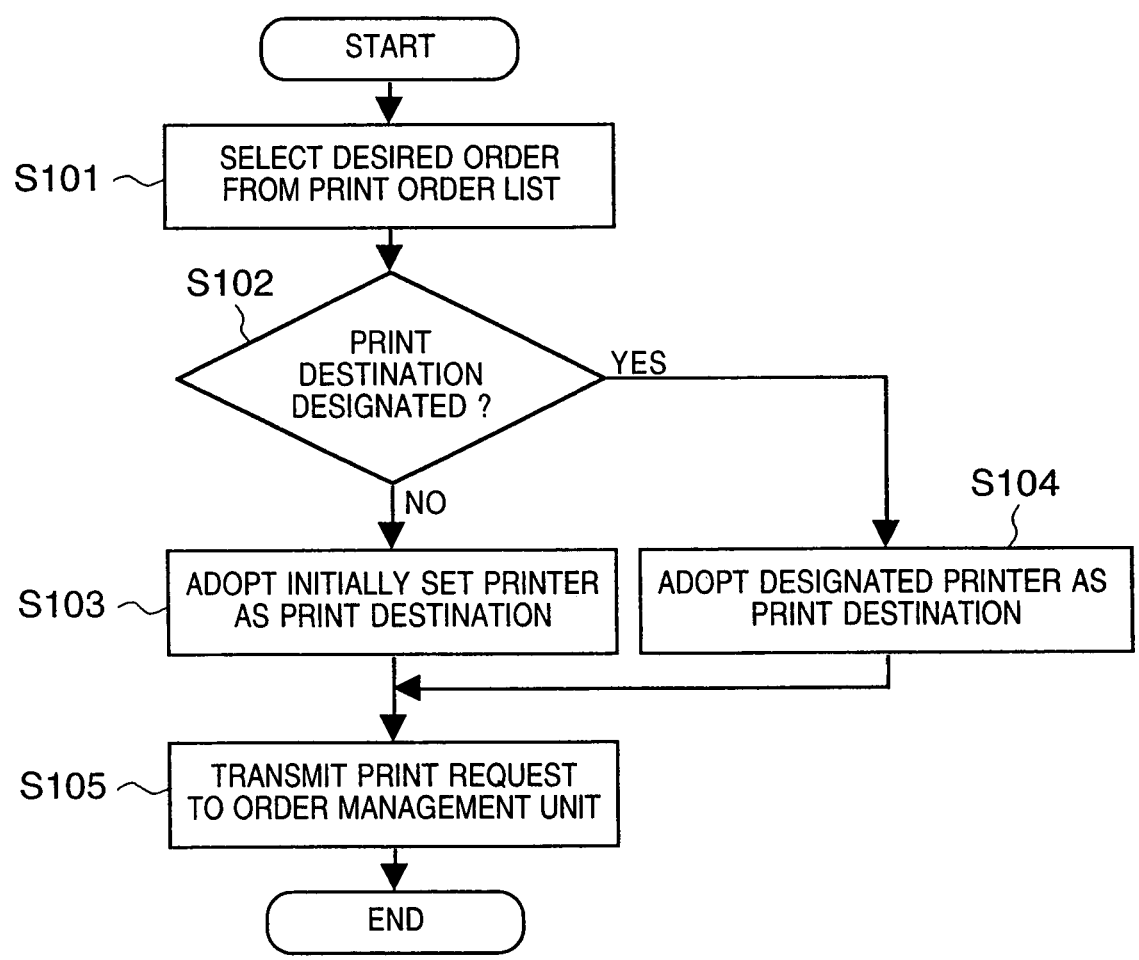
FIG. 8 is a flowchart illustrating a print request operation according to this embodiment.

FIG. 8 is a flowchart illustrating a print request operation executed by the CPU 301 of external storage device 103a according to this embodiment.

At step S101, the operator observes the list of the kind shown in FIG. 6 or 7 displayed on the display unit 304 of the terminal device 201a and selects an order desired to be printed. Then, at step S102, the CPU 301 executes processing for designating a print destination stored in the internal storage device 302, whereby a window of the kind shown in FIG. 9 is displayed on the display unit 304. The operator selects to designate or not to designate a print destination on the display unit 304 of the terminal device 201a.

If the operator does not designate a print destination, control proceeds to step S103 to decide a print destination in dependence upon an initially set value that was stored beforehand in the external storage device 303 of the terminal device 201a or in the external storage device 403 of the order management unit 203 when the image data was stored in the external storage device 303. More specifically, if the initially set value is a fixed output destination, a printer (e.g., printer 202c) set in advance as the default is made the print destination. If the initially set value is that of the local terminal, a printer (e.g., 202a or 202b) connected directly to the terminal device which the operator used to issue the print order is made the print destination.

In other words, if the initially set value is indicative of the local terminal, the printer 202a connected directly to the terminal device 201a that issued the print order is designated as the print destination. It should be noted that if actual image data has been stored in the external storage device 303 within terminal device 201a, printing can be executed immediately because it is unnecessary to transfer data via the network 204 at the time of printing.

If the operator designates a print destination at step S102 using the print-destination designating screen shown in FIG. 9, control proceeds to step S104, where the designated printer is adopted as the print destination. Steps S103 and S104 are followed by step S105, at which the print request which includes the selected order ID and print destination is transmitted to the order management unit 203.

Next, an operation through which the order management unit 203 specifies printing by the printer of the designated destination based upon the print request from the terminal device 201a will be described.

Figure 10:
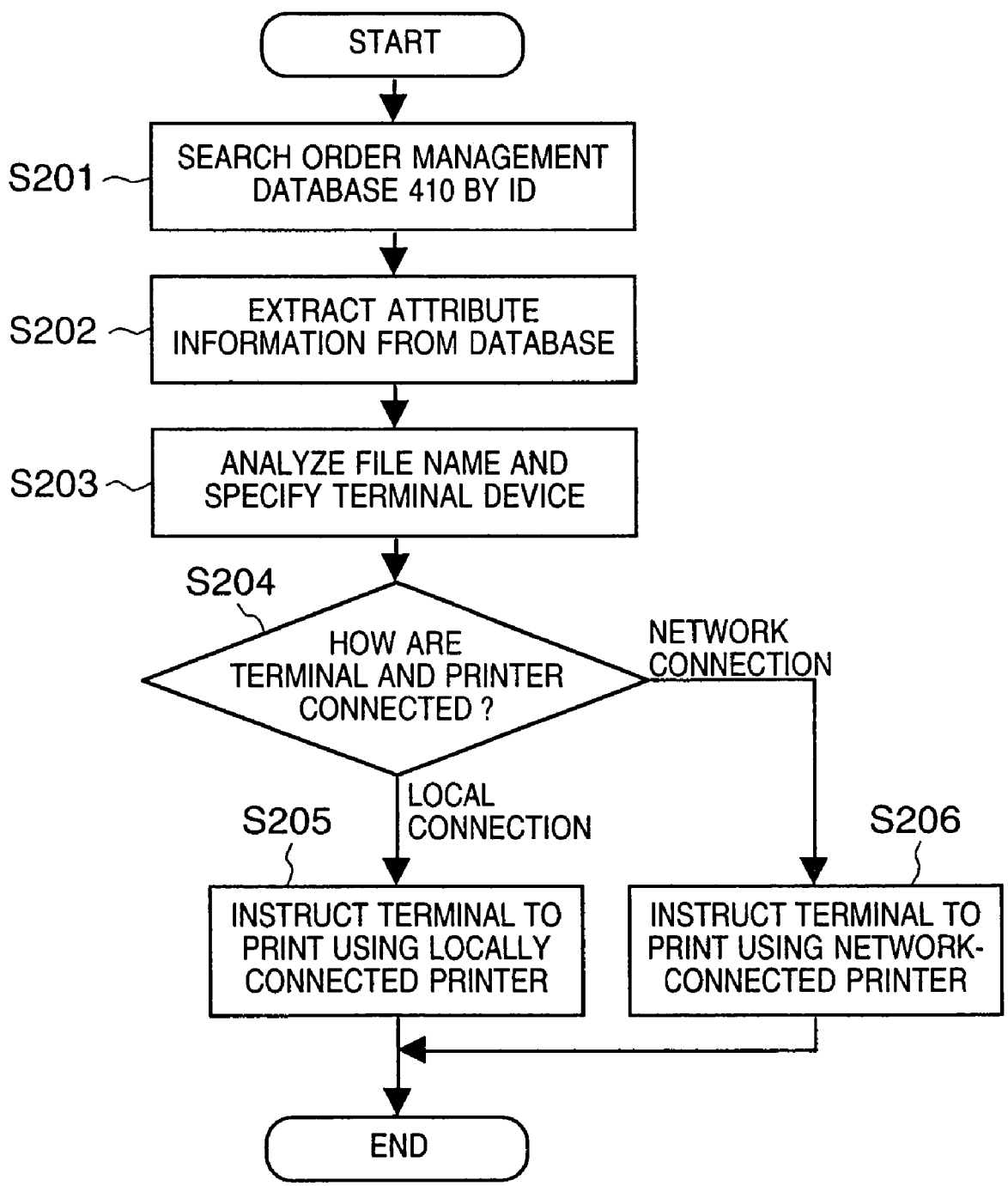
FIG. 10 is a flowchart showing the operation of the order management unit according to this embodiment.

FIG. 10 is a flowchart illustrating an operation executed by the CPU 401 of the order management unit 203 according to this embodiment.

First, at step S201, the CPU 401 of the order management unit 203 searches the order management database 410 based upon the data ID sent from the terminal device 201a and extracts information stored in each field of the data ID for which a match has been obtained (S202). The extracted information includes the attribute information such as the image file name and number of pages to be printed, as shown in FIG. 5.

Next, at step S203, the CPU 401 executes an analysis module as means for analyzing the image file name, analyzes the image file name and determines to which terminal device the external storage device storing the applicable image file is connected. For example, if the file name of the image file is terminal__1a:imag1.dat, then the CPU 401 judges that the image file has been stored in terminal__1a, i.e., in terminal device 201a. It is assumed here that the analysis module has been stored in the internal storage device 402.

Next, at step S204, the CPU 401 determines whether the terminal device having the external storage device 303 in which the image file has been stored is connected locally to the designated printer via the peripherals controller 306. If the terminal device and the designated printer have been connected locally, control proceeds to step S205, where information such as the image file name and number of pages to be printed is transferred to this terminal device and the terminal device is instructed to print the image in the designated number of copies using the locally connected printer.

For example, assume that the image file specified by the order ID has been stored in the external storage device 303 connected to the terminal device 201c and that the designated printer is the locally connected printer 202b. In response to a print order received from the order management unit 203 via the network 204, the terminal device 201c transfers the image bit sequence and attribute information, which is typified by the information on number of copies, stored in the image file under the received image file name to the printer 202b connected locally via the peripherals controller 306. The printer 202b then prints the image in accordance with the received image bit sequence and attribute information received.

If it is determined at step S204 that the terminal device having the external storage device in which the image file has been stored is not connected locally to the designated printer via the peripherals controller 306, i.e., that it is connected via the network device 307, then control proceeds to step S206. Here the image file name and information such as the number of pages to be printed and information designating the printer are transferred to the terminal device to which is connected the external storage device storing the image file specified by the order ID, and this terminal device is instructed to print the image in the designated number of copies using the printer connected via the network device 307.

For example, assume that the image file specified by the order ID has been stored in the external storage device 303 connected to the terminal device 201b and that the designated printer is the printer 202c connected via the network. In response to a print order received via the network device 307, the terminal device 201b acquires the image file data from the external storage device 303 connected locally and transfers the image data, which has been stored in the internal storage device 302, to the printer 202c via the network device 307 from a transfer module, which is the image transfer means. Also transferred to the printer 202c is information such as the number of copies to be printed. The printer 202c then prints the image in accordance with the received image bit sequence and attribute information received.

When printing ends through the operation described above, the CPU 401 of the order management unit 203 stores the printing date in the applicable record of the order management database 410 shown in FIG. 5, thereby updating the database.

The above-described registration of a print order, acquisition of the list and execution of printing may all be performed at the same terminal or each may be performed at a different terminal. For example, the printing of a print order that has been registered in the order management unit 203 from the terminal device 201a can be commanded from the terminal device 201b. Further, by providing the order management unit 203 with an authentication function, only a specific terminal device is allowed to monitor the registered order and to execute print processing based upon the order. This makes it possible to prevent an unspecified terminal user from accessing an image file that has been stored in one's own machine.

[Totalization of Billing Information]

Thus, as set forth above, management of printing orders to a plurality of printers is performed by the single order management unit 203 from a plurality of terminal devices. In other words, totalization of billing information and statistical information regarding all print orders in the system is completed by totalizing the data acquired from the order management database 410 of the single order management unit 203. An example of this will be illustrated below.

If an operator uses the terminal device 201a to command the totalization of billing information regarding print orders that were printed on a given day, the CPU 301 of the terminal device 201a sends a billing totalization command to the order management unit 203 via the network device 307.

In accordance with the command received, the CPU 401 of the order management unit 203 executes a statistical-information totalization module, which serves as statistical-information totalizing means, stored in the internal storage device 402. The statistical-information totalization module executed by the CPU 401 first extracts the list of print orders printed on the given day from the order management database 410. At this time reference is had to the printing-date field 504 of the order management database 410. The CPU 410 of the order management unit 203 then acquires statistical information corresponding to these print orders from the order management database 410, executes processing such as calculation of the billing fee per page printed and sends the results of calculation to the terminal device 201a via the network device 407.

In response, the CPU 301 of the terminal device 201a causes the received billing information to be displayed on the display unit 304.

Thus, in accordance with this embodiment of the present invention, simultaneous printing by a plurality of operators can be achieved by constructing a system having a single order management unit 203, designating means for designating printers, a plurality of terminal devices and a plurality of printers.

Further, by exercising management using a pointer (file name) that points to actual print data present at each terminal, rather than storing the actual print data in the order management unit 203, the system can be implemented without requiring that the order management unit 203 have a large storage capacity.

Further, by centralizing the order management database 410, the totalization of statistical information, such as the totalization of billing information, that has been performed separately for each printer in the prior art can now be executed collectively by the order management unit 203.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained even by supplying a storage medium storing the program codes of the software for performing the functions of the foregoing embodiment to a system or to an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the functions of the above embodiment.

Thus, in accordance with the embodiment, as described above, printing can be performed efficiently by a plurality of printers in response to print requests from a plurality of terminal devices connected via a network.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus connected via a network to a plurality of terminal devices, the information processing apparatus for instructing a specified terminal device of the plurality of terminal devices to transfer image data to a printer in response to a print request received by the information processing apparatus from one of the plurality of terminal devices, said apparatus comprising:

an order management database storing management information about the image data stored in the specified terminal device;

a specifying unit adapted to specify a terminal device in which the image data to be printed has been stored in accordance with the print request and the stored management information, wherein the print request includes information for designating the printer as a print destination; and a first designating unit adapted to instruct the terminal device specified by said specifying unit to transfer the image data to the printer designated as the print destination without passing the image data through the information processing apparatus; and management unit adapted to manage record information including a printing date indicating the printing was performed by the printer based on the instruction by said first designating unit.

2. The apparatus according to claim 1, wherein each of the plurality of terminal devices comprises a second designating unit adapted to designate the printer as the print destination, and said first designating unit instructs transfer of the image data in dependence upon mode of connection between the printer designated by said second designating unit and the terminal device storing the image data.

3. The apparatus according to claim 2, wherein the mode of connection indicates said first designating unit instructs transfer of the image data in dependence upon whether said terminal device and the printer are connected locally or via a network.

4. The apparatus according to claim 1, wherein said specifying unit includes a management database for managing the image data as image file names, and wherein said specifying unit specifies the terminal device, which is storing image data to be printed, based upon an image file name that has been registered in said management database.

5. The apparatus according to claim 4, wherein the image file name is a combination of a unique file name in the terminal device storing the image data and an identifier of this terminal device.

6. The apparatus according to claim 4, further comprising a totalization unit adapted to totalize statistical information based upon attribute information in said management database.

7. The apparatus according to claim 6, wherein the attribute information includes information on identifiers, image file names, number of pages to be printed and the printing date.

8. A method of controlling an information processing apparatus connected via a network to a plurality of terminal devices, the information processing apparatus for instructing a specified terminal device of the plurality of terminal devices to transfer image data to a printer in response to a print request received by the information processing apparatus from one of the plurality of terminal devices, said method comprising:

storing management information in an order management database, the management information about the image data stored in the specified terminal device;

specifying a terminal device, in which the image data to be printed has been stored, in accordance with the print request and the stored management information, wherein the print request includes information for designating the printer as a print destination;

instructing the terminal device specified at said specifying step to transfer the image data to the printer designated as the print destination without passing the image data through the information processing apparatus; and managing record information including a printing date indicating the printing performed by the printer based on the instruction.

9. The method according to claim 8, further comprising, performed by any of the plurality of terminal devices, designating the printer as the print destination, wherein said instructing step instructs transfer of the image data in dependence upon mode of connection between the printer designated in said designating step and the terminal device storing the image data.

10. The method according to claim 9, wherein the mode of connection indicates whether the terminal device and the printer are connected locally or via a network.

11. The method according to claim 8, wherein said specifying step includes specifying the terminal device, which is storing image data to be printed, based upon an image file name that has been registered in a management database for managing the image data as image file names.

12. The method according to claim 11, wherein the image file name is a combination of a unique file name in the terminal device storing the image data and an identifier of this terminal device.

13. The method according to claim 11, further comprising totalizing statistical information based upon attribute information in the management database.

14. The method according to claim 13, wherein the attribute information includes information on identifiers, the image file names, number of pages to be printed and the printing date.

15. A computer-readable storage medium storing program code for causing a computer to implement the method set forth in claim 8.

16. The apparatus according to claim 1, wherein the print request is issued from a first terminal device, and said specifying unit specifies a second terminal device as the terminal device in which the image data to be printed has been stored.

17. The method according to claim 8, wherein the print request is issued from a first terminal device, and said specifying unit specifies a second terminal device as the terminal device in which the image data to be printed has been stored.

* * * * *

UNITED STATES PATENT AND TRADEMARK OFFICE
CERTIFICATE OF CORRECTION

PATENT NO. : 7,079,268 B1 Page 1 of 1
APPLICATION NO. : 09/503478
DATED : July 18, 2006
INVENTOR(S) : Noriaki Tanaka It is certified that error appears in the above-identified patent and that said Letters Patent is hereby corrected as shown below:

COLUMN 8:
Line 53, "management" should read -- a management --.

Signed and Sealed this

Tenth Day of April, 2007

JON W. DUDAS
*Director of the United States Patent and Trademark Office*